Patented Nov. 11, 1952

2,617,790

UNITED STATES PATENT OFFICE 2,617,790

REACTION OF POLYSTYRENE WITH AN ISOCYANATE

John Mann Butler, Dayton, Ohio, assignor to Monsanto Chemical Company, St. Louis, Mo., a corporation of Delaware No Drawing. Application December 30, 1947, Serial No. 794,795

4 Claims. (Cl. 260—93.5)

This invention relates to modified polystyrenes having improved chemical and physical properties. More particularly the invention relates to polystyrenes which are substituted with carbamyl radicals.

Polystyrene is a useful industrial material but the breadth of its industrial application is limited by reason of its low softening temperature and its solubility in many common solvents. Accordingly, the principal purpose of this invention is to provide a means of improving the heat distortion point and resistance to solvents and thereby extend the field of utility for the polystyrene.

It has been discovered that when polystyrene is reacted with an N-substituted carbamyl halide, the resulting addition product has most of the desirable properties of polystyrene, but does not have the objectionable low heat distortion point. If desired the new products can be prepared with improved solvent resistance. The chemical reaction involved may be represented by the following:

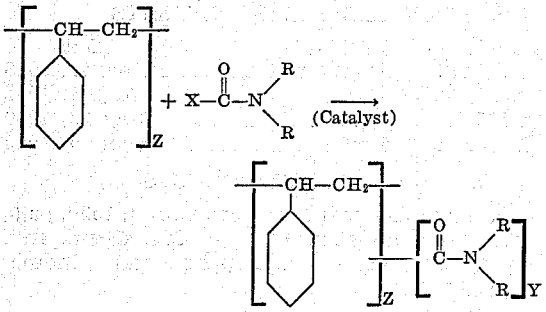

wherein R is hydrogen, an alkyl radical, chlorophenyl, an alkyl phenyl, biphenyl radicals, or chlorobiphenyl, Z is a whole number indicating the extent of polymerization of the polystyrene, and Y is a whole number indicating the extent of substitution on the benzene rings of the polystyrene.

This reaction is preferably conducted under anhydrous conditions in the presence of inert solvents, for example, o-dichlorobenzene, chlorobenzene, tetrachloroethane, nitro benzene or homologues thereof, and in the presence of a Friedel and Crafts catalyst, for example aluminum chloride, boron trifluoride, ferric chloride, hydrogen fluoride, zinc chloride and aluminum bromide. The reagents useful in effecting the carbamylation of the polystyrene are carbamyl halide, or N-substituted carbamyl halides having one or both hydrogen atoms substituted with radicals which may be alkyl radicals having from one to 18 carbon atoms, for example methyl, ethyl, propyl, isopropyl, butyl, hexyl, dodecyl, and stearyl, phenyl, chlorophenyl, methyl phenyl, chlorodiphenyl and biphenyl radicals. The carbamylation reaction may be conducted to any desired extent, since any number of substitutions will effect a beneficial result. The substitution of a few benzene rings will produce a resin having an improved heat distortion point which is further improved when the number of substitutions is increased. If the reaction is carried out to a greater extent the polymers become resistant to many solvents, such as benzene and methylene dichloride which are good solvents for unmodified polystyrene. Highly substituted polystyrenes made in accordance with this invention are insoluble in benzene, ethylene dichloride, dioxane, dichlorobenzene and acetone.

In the practice of the invention the N-substituted carbamyl halide may be generated in situ from an isocyanate by reaction with the hydrogen halide present in the reaction mixture. Thus an isocyanate, for example phenyl isocyanate, methyl isocyanate and octadecyl isocyanate, may be used to effect the reaction with polystyrene.

The new substituted polystyrenes are useful in many of the applications for polystyrene and are particularly useful in those where high softening temperatures and solvent resistance are desirable.

Further details in the preparation of the new compounds are set forth with respect to the following examples.

*Example 1*

A 500 cc., 3-necked flask was provided with a stirring mechanism, thermometer and a dropping funnel topped by a drying tube. The flask was charged with 50 grams of o-dichlorobenzene, 12 grams of phenyl isocyanate, and 15 grams of finely divided sublimed aluminum chloride. The flask was then charged through the dropping funnel with 10.4 grams of polystyrene having an average molecular weight of 75,000 dissolved in 90 grams of o-dichlorobenzene. The addition was begun at room temperature and, as the reaction mass became more viscous, the temperature was raised gradually to 55–60° C., and was thinned with 200 grams of o-dichlorobenzene. After the reaction had been continued for a total of one and one-half hours the reaction mass was deep red in color and consisted of a mixture of a thin liquid and a gelatinous substance. The gel was separated and thoroughly mixed with alcohol, filtered, and washed with alcohol, a white granular polymer thereby being recovered. The polymer was then dissolved in benzene, washed with dilute hydrochloric acid and water and then reprecipitated by addition to ethyl alcohol. The polymer was obtained in the form of a white finely divided solid and was found to have a Maquenni Bar softening point of 155° C. compared with a 118° C. softening point for polystyrene. The polymer had one substituent for each 3.84 styrene units.

*Example 2*

Using the apparatus and procedure described in the preceding example, 15 grams of anhydrous aluminum chloride, 100 grams of o-dichlorobenzene, and 6 grams of methyl isocyanate were charged to a reaction flask. At a temperature of 25–35° C. 104 grams of a 10 percent solution of 70,000 average molecular weight polystyrene dissolved in o-dichlorobenzene was added at a uniform rate over a period of forty minutes. The temperature was then slowly raised to 75° C. over a period of forty-five minutes at which time the polymer solution became very viscous. The reaction mass was then mixed with an excess of ethyl alcohol to deactivate the catalyst and to remove all unreacted isocyanate. The polymer which was precipitated was found to be insoluble in benzene and acetone, and was found to have a Maquenni Bar softening point of 148° C. It was found that there was one methyl isocyanate molecule substituted for each 4.7 benzene nuclei.

*Example 3*

The procedure set forth in Example 2 was repeated except that the reaction was carried out for three hours at room temperature. The polymer so obtained had one amide substituent for each 12.5 benzene nuclei. This polymer was found to be insoluble in benzene.

*Example 4*

Using the procedure described in Example 1, 37 grams of octadecyl isocyanate and 100 grams of 10 percent polystyrene solution in o-dichlorobenzene was reacted by adding the polystyrene solution to the isocyanate dissolved in 100 grams of o-dichlorobenzene and in the presence of 17.3 grams of aluminum chloride. The reaction was continued for four hours and a maximum temperature of 60° C. was reached. The reaction mass was quenched with dilute hydrochloric acid and precipitated by the addition of ethanol. The polymer was purified by dissolving in benzene and reprecipitating by addition to ethanol. This benzene soluble polymer had one amide substituent for each 11.3 styrene nuclei.

Although the invention has been described with respect to specific embodiments thereof, it is not intended that the details should be construed as limitations upon the scope of the invention except to the extent incorporated in the following claims.

I claim:

1. A method of preparing ring-substituted polystyrenes which comprises reacting resinous polystyrene with an isocyanate of the structure:

$$R\!-\!N\!=\!C\!=\!O$$

wherein the R is a radical of the group consisting of alkyl, phenyl, chlorophenyl, alkylphenyl, biphenyl and chlorobiphenyl, wherein the alkyl groups have up to 18 carbon atoms, in an inert organic solvent and in the presence of a halide Friedel-Crafts catalyst, and recovering the resulting substituted polystyrene.

2. The method of preparing ring-substituted polystyrenes which comprises reacting resinous polystyrene with phenyl isocyanate in an inert organic solvent and in the presence of a halide Friedel-Crafts catalyst, and recovering the resulting compound.

3. The method of preparing ring-substituted polystyrene which comprises reacting resinous polystyrene with methyl isocyanate in an inert organic solvent and in the presence of a halide Friedel-Crafts catalyst, and recovering the resulting compound.

4. The method of preparing ring-substituted polystyrene which comprises reacting resinous polystyrene with octadecylisocyanate in an inert organic solvent and in the presence of a halide Friedel-Crafts catalyst, and recovering the resulting compound.

JOHN MANN BUTLER.

REFERENCES CITED

The following references are of record in the file of this patent:

UNITED STATES PATENTS

| Number | Name | Date |
| --- | --- | --- |
| 2,137,287 | Hopff et al. | Nov. 22, 1938 |
| 2,381,063 | Kung | Aug. 7, 1945 |
| 2,508,717 | Jones | May 23, 1950 |
| 2,520,917 | Dickey | Sept. 5, 1950 |

OTHER REFERENCES

Matsui: Chemical Abstracts, vol. 44, 1950, page 9187, being an abstract of J. Soc. Chem. Ind. Japan, vol. 46, 1943, Supplemental binding, page 126.